United States Patent
Mantzanas et al.

(10) Patent No.: US 11,984,830 B2
(45) Date of Patent: May 14, 2024

(54) INVERTER WITH SWITCH CONTROL AND A METHOD OF CONTROLLING AN INVERTER

(71) Applicant: Valeo Siemens eAutomotive Germany GmbH, Erlangen (DE)

(72) Inventors: Panagiotis Mantzanas, Erlangen (DE); Daniel Kübrich, Schlüsselfeld (DE); Thomas Dürbaum, Baiersdorf (DE); Alexander Bucher, Nuremberg (DE); Alexander Pawellek, Erlangen (DE); Christian Hasenohr, Erlangen (DE); Harald Hofmann, Nuremberg (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 0 days.

(21) Appl. No.: 17/629,900

(22) PCT Filed: Jul. 27, 2020

(86) PCT No.: PCT/EP2020/071115
§ 371 (c)(1),
(2) Date: Jan. 25, 2022

(87) PCT Pub. No.: WO2021/018827
PCT Pub. Date: Feb. 4, 2021

(65) Prior Publication Data
US 2022/0255488 A1    Aug. 11, 2022

(30) Foreign Application Priority Data

Jul. 29, 2019  (DE) .................... 10 2019 120 438.0

(51) Int. Cl.
*H02P 27/08*    (2006.01)
*H02M 7/5395*   (2006.01)
(Continued)

(52) U.S. Cl.
CPC ........ *H02P 27/085* (2013.01); *H02M 7/5395* (2013.01); *H02P 6/08* (2013.01); *H02P 21/0089* (2013.01); *H02P 2201/13* (2013.01)

(58) Field of Classification Search
CPC .......... H02P 27/08; H02P 27/085; H02P 6/08; H02P 21/0089; H02P 2201/13; H02M 7/5395
See application file for complete search history.

(56) References Cited

U.S. PATENT DOCUMENTS 9,481,254 B1    11/2016  Schulz et al.
2007/0175429 A1*  8/2007  Yanagida ................ B60L 50/61
                                                    123/179.14
(Continued)

FOREIGN PATENT DOCUMENTS

DE    19501375 A1    8/1995
EP    2579452 A1    4/2013

OTHER PUBLICATIONS

International Search Report and Written Opinion in corresponding International Application No. PCT/EP2020/071115, dated Oct. 8, 2020 (13 pages).

*Primary Examiner* — Rina I Duda
(74) *Attorney, Agent, or Firm* — Osha Bergman Watanabe & Burton LLP

(57) ABSTRACT

A control device (8) for an inverter (2) that feeds an electric machine (3), wherein the control device (8) is configured to provide pulse-width-modulated switching signals (15) at a carrier frequency to drive switching elements (12) of the inverter (2), wherein the control device (8) is configured to ascertain the carrier frequency within at least one operating range (22, 23) depending on a piece of operating point information that describes an operating point defined by a rotation speed and a torque of the electric machine (3) in such a way that the carrier frequency is reduced within the (Continued)

at least one operating range (22, 23) compared to a maximum carrier frequency operating point at which a maximum carrier frequency is specified in the operating range.

14 Claims, 4 Drawing Sheets

(51) Int. Cl.
*H02P 6/08* (2016.01)
*H02P 21/00* (2016.01)

(56) References Cited

U.S. PATENT DOCUMENTS

| | | | |
|---|---|---|---|
| 2009/0108780 A1* | 4/2009 | Schulz | B60L 15/08 |
| | | | 318/807 |
| 2009/0115362 A1* | 5/2009 | Saha | B60K 6/26 |
| | | | 180/65.285 |
| 2010/0007300 A1 | 1/2010 | Hein et al. | |
| 2014/0354191 A1* | 12/2014 | Nakazumi | H02P 21/0021 |
| | | | 318/3 |
| 2015/0365040 A1 | 12/2015 | Saha et al. | |

* cited by examiner

INVERTER WITH SWITCH CONTROL AND A METHOD OF CONTROLLING AN INVERTER

The present invention relates to a control device for an inverter that feeds an electric machine, wherein the control device is configured to provide pulse-width-modulated switching signals at a carrier frequency to drive switching elements of the inverter.

The invention additionally relates to an inverter, an assembly having an inverter and an electric machine, a method for operating an inverter and a computer program.

The increasing significance of electrically driven vehicles has brought inverters and their associated control devices for such application fields into the focus of industrial development efforts. Control devices of a type that provide pulse-width-modulated switching signals at a constant carrier frequency to drive switching elements of the inverter are known.

Switching losses inevitably arise in the course of such a switching operation. Said switching losses have a strong influence on the overall efficiency of the inverter or an assembly having the inverter and an electric machine, since they make up a significant proportion of the total losses. At the same time, the inverter must be operated in such a way that a maximum peak-valley value of a DC link voltage at its DC link capacitor is not exceeded, since the DC link capacitor of the inverter is designed for a maximum permissible peak-valley value in terms of its capacity—and thus also its installation space, weight and cost.

The invention is therefore based on the object of making more efficient operation of an inverter possible without increasing a capacitance of its DC link capacitor in the process.

According to the invention, this object is achieved by a control device of the type mentioned at the beginning, which is configured to ascertain the carrier frequency within at least one operating range depending on a piece of operating point information that describes an operating point defined by a rotation speed and a torque of the electric machine in such a way that the carrier frequency is reduced within the at least one operating range compared to a maximum carrier frequency operating point at which a maximum carrier frequency is specified in the operating range.

The invention is based on the knowledge that peak-valley values of a DC link voltage at a DC link capacitor of the inverter typically have pronounced maximum values and a reduction in the carrier frequency causes an increase in the peak-valley value on the one hand and a reduction in switching losses during a switching operation of the switching elements on the other hand. Since the maximum carrier frequency operating point can be assigned to such a maximum value of the peak-valley values, lower peak-valley values beyond the maximum value introduce scope for lowering the switching losses by reducing the carrier frequency in a manner depending on the operating point. A more efficient operation of the inverter is advantageously made possible in this way without a capacitance of a DC link capacitor having to be increased as a result.

In the control device according to the invention, it is preferred when an operating range has a full-load operating point, at which a maximum torque that can be specified in terms of absolute value for its rotation speed is present, as the maximum carrier frequency operating point and extends into partial-load operation, wherein the control device is configured to reduce the carrier frequency as the distance from the maximum carrier frequency operating point increases. This operating range may also be referred to as the first operating range. It has been recognized that a maximum carrier frequency operating point can be found on one or a respective full-load line on which the maximum positive or negative torque that can be provided for each rotation speed value lies. In this way, an improved efficiency can be achieved in partial-load operation, that is to say in operation with torque values which are lower in terms of absolute value for a respective rotation speed than on the full-load line.

The rotation speed of the full-load operating point advantageously deviates by a maximum of 40 percent, in particular a maximum of 30 percent, from the rotation speed at a corner operating point, which describes a transition from a basic rotation speed operation to a power-limiting operation or to a field-weakening operation.

If the control device is configured to specify carrier frequencies for operating points with any sign of the torque, provision may be made for the first operating range to be defined for positive torques and for a further first operating range to be defined for negative torques.

In the control device according to the invention, it is preferred if an operating range lies within a torque interval limited by an upper torque limit and a lower torque limit and the control device is configured to reduce the carrier frequency in the operating range as the rotation speed decreases, in particular independently of the torque. This operating range may also be referred to as the second operating range. This can prevent undesirably high harmonic distortions, in particular high THD (Total Harmonic Distortion) values, which can lead to mechanical vibrations in the electric machine, from occurring due to a lower ratio of the carrier frequency to the rotation speed.

If the control device is configured only to specify carrier frequencies for operating points with the same sign of the torques, a torque limit is preferably zero. If the control device is also configured to specify carrier frequencies for operating points with any sign of the torques, the upper torque limit may be positive and the lower torque limit may be negative. In particular, the absolute value of one or a respective torque limit is at least five percent of a maximum torque that can be specified by the control device.

According to an embodiment that is particularly easy to implement, the second operating range is limited by the torque limits.

The first and second operating ranges are typically defined without overlapping. Specifiable carrier frequencies preferably run continuously at boundaries at which the first and second operating range adjoin one another.

Optionally, the control device according to the invention may be configured to specify the carrier frequency with a fixed value within a further operating range defined without overlapping with respect to the at least one operating range and comprising operating points above a rotation speed threshold value. At rotation speeds above this rotation speed threshold value, the reduction in switching losses is only very weak, with the result that there is no need to select the carrier frequency in a manner depending on the operating point. The rotation speed threshold value is typically in power-limiting operation or in field-weakening operation. The carrier frequency is then expediently the maximum carrier frequency provided.

In an advantageous development of the control device according to the invention, provision may furthermore be made for it to be configured not to ascertain the carrier frequency below a specified or specifiable minimum value. This prevents the carrier frequency becoming so low for low values of the rotation speed and the torque that their ratio to the frequency of a respective phase current of the electric machine falls below a specified minimum ratio, as a result of which undesired vibrations of the electric machine that can be perceived acoustically may arise. Operating points at which the minimum value is specified can to that extent also be regarded as a further operating range.

To enable an implementation of the control device according to the invention with particularly little effort, it is preferably configured to select the carrier frequency from a characteristic map that assigns carrier frequency values to pairs of rotation speed values and torque values. The characteristic map may be realized, for example, by way of a look-up table. The control device typically comprises a memory unit in which the characteristic map is stored.

Provision may furthermore be made for the characteristic map to describe an at least piece-wise linear assignment of the pairs and the carrier frequency values. It is alternatively possible that the characteristic map is defined by discrete pairs, and that the control device is configured to determine the carrier frequency through, in particular linear, interpolation of the carrier frequency values assigned to the discrete pairs.

As an alternative to the use of a characteristic map, the control device according to the invention can be configured to ascertain the carrier frequency by means of an analytical calculation specification from which the carrier frequency can be ascertained depending on the operating point.

The characteristic map or the calculation specification may have been ascertained, for example, through measurement or simulation for a specific configuration of the inverter and of the electric machine.

The control device according to the invention can also be configured to ascertain an updated carrier frequency in each case upon receipt of an updated piece of operating point information and/or after a specified or specifiable period of time has elapsed and/or after completion of an electrical period of the electric machine and/or after completion of a period of a respective switching signal. The carrier frequency can thus be adapted in each case to the instantaneous operating point at expedient points in time.

It is also possible that the control device according to the invention is configured to ascertain the operating point information from a piece of torque information received at an input and/or a piece of rotation speed information received at an input and/or depending on a piece of current information describing phase currents feeding the electric machine received at an input, and/or to estimate the operating point information in the context of a control process for ascertaining the switching signals. In particular the torque can be determined from the current information.

The object on which the invention is based is also achieved by an inverter comprising a DC link capacitor, switching elements which are interconnected to convert a DC link voltage applied to the DC link capacitor into a single-phase or multi-phase AC voltage depending on switching signals that drive the switching elements, and a control device according to the invention.

The DC link capacitor may be formed by a single capacitor element or by a plurality of capacitor elements interconnected in parallel and/or in series.

The inverter can also comprise an analog-to-digital converter that is configured to convert analog measurement signals into the current information and/or the torque information and/or the rotation speed information.

The object on which the invention is based is also achieved by an assembly having an inverter according to the invention and an electric machine that can be operated by means of the AC voltage.

It is preferred here if the ascertainment of the carrier frequency represents the relationship $$f_{PWM} = \frac{u_{DC,pp}|_{f_{PWM,max}}}{u_{DC,pp,max}} \cdot f_{PWM,max}$$

or $$f_{PWM} = \max\left(\frac{u_{DC,pp}|_{f_{PWM,max}}}{u_{DC,pp,max}} \cdot f_{PWM,max}, \frac{f_{rot}}{f_{rot,max}} \cdot f_{PWM,max}\right)$$

or $$f_{PWM} = \max\left(\frac{u_{DC,pp}|_{f_{PWM,max}}}{u_{DC,pp,max}} \cdot f_{PWM,max}, \frac{f_{rot}}{f_{rot,max}} \cdot f_{PWM,max}, f_{PWM,min}\right)$$

during operation of the assembly, wherein
$f_{PWM}$ describes the carrier frequency to be ascertained,
$f_{PWM,max}$ describes the maximum carrier frequency,
$f_{PWM,min}$ describes the minimum value of the carrier frequency, $$u_{DC,pp}|_{f_{PWM,max}}$$

describes a peak-valley value of the DC link voltage at the maximum carrier frequency that is dependent on the torque and on the rotation speed,
$u_{DC,pp,max}$ describes a specified maximum value of the peak-valley value of the DC link voltage,
$f_{rot}$ describes the rotation speed and
$f_{rot,max}$ describes a maximum rotation speed.

In the assembly according to the invention, provision can be made for a respective maximum carrier frequency operating point to correspond to an operating point at which peak-valley values of the DC link voltage have a local maximum.

The object on which the invention is based is also achieved by a method for operating an inverter for the supply of an electric machine, comprising the following steps carried out by a control device: ascertaining a carrier frequency of pulse-width-modulated switching signals for driving the inverter within at least one operating range depending on a piece of operating point information that describes an operating point defined by a rotation speed and a torque of the electric machine in such a way that the carrier frequency is reduced within the at least one operating range compared to a maximum carrier frequency operating point at which a maximum carrier frequency is specified in the operating range; and providing the switching signals for switching elements of the inverter.

The object on which the invention is based is finally also achieved by a computer program, comprising commands which, when the program is executed by a computer, cause this to execute the steps, carried out by the control device, of the method according to the invention.

All of the explanations relating to the control device according to the invention, to the inverter according to the invention and to the assembly according to the invention can be applied in an analogous manner to the method according to the invention and the computer program according to the invention, such that the aforementioned advantages can also be achieved with these.

Further advantages and details of the present invention emerge from the exemplary embodiments described below and on the basis of the drawings. These are schematic illustrations in which.

Figure 1:
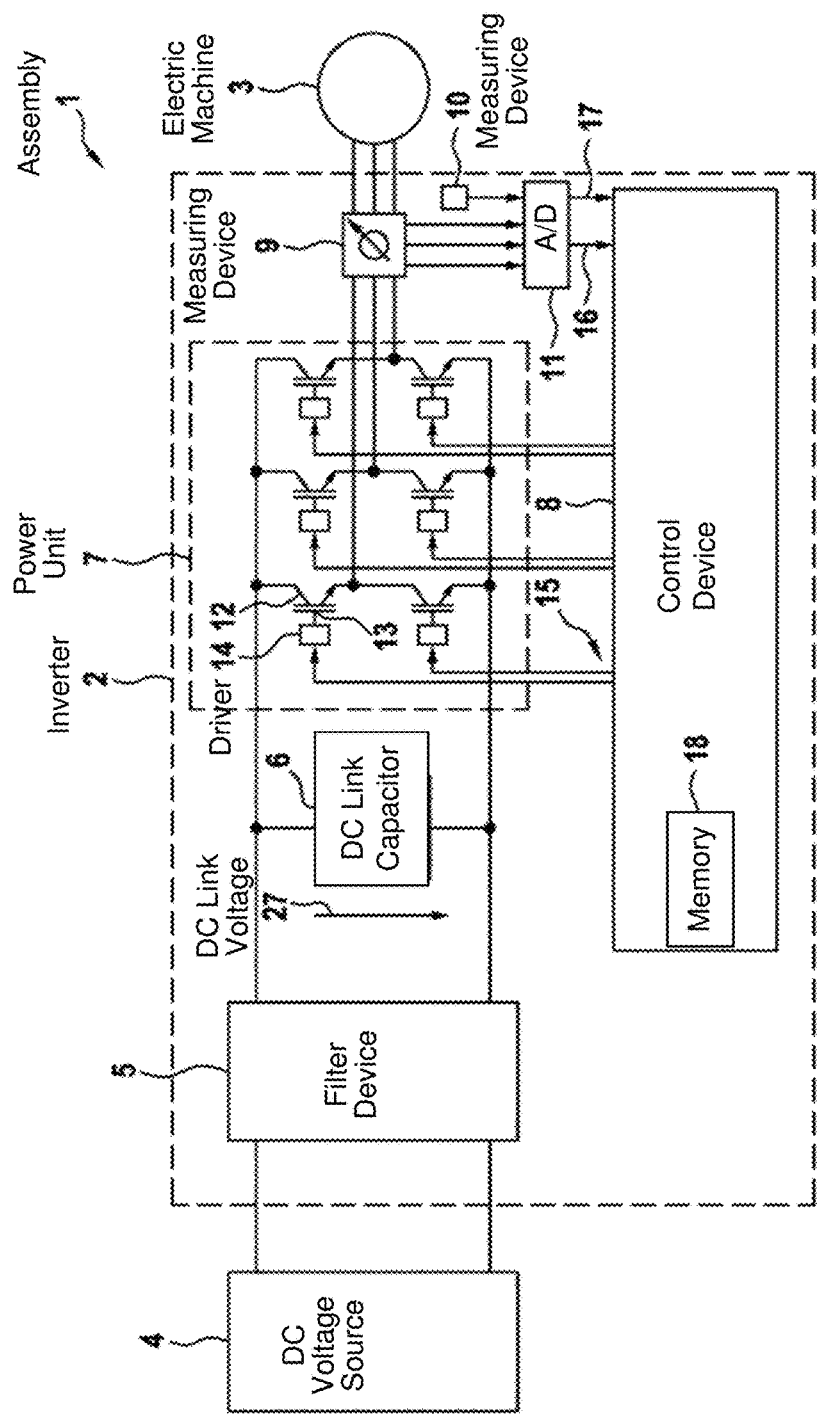
FIG. 1 shows a block diagram of an exemplary embodiment of an assembly according to the invention with an exemplary embodiment of an inverter according to the invention and an exemplary embodiment of a control device according to the invention.

FIG. 1 is a block diagram of an exemplary embodiment of an assembly 1, comprising an exemplary embodiment of an inverter 2 and an electric machine 3 that is configured to drive a vehicle that can be partially or fully electrically driven. The assembly 1 further comprises a DC voltage source 4 that is designed in the present case as a high-voltage battery.

The inverter 2 comprises a filter device 5 that is designed in the present case as an EMC filter, a DC link capacitor 6, a power unit 7, an exemplary embodiment of a control device 8, a first measuring device 9, a second measuring device 10 and an analog-to-digital converter device 11.

The power unit 7 comprises a plurality of switching elements 12 that are designed as semiconductor switching elements, for example as IGBTs or as power MOSFETs. The switching elements 12 are interconnected in pairs to form half-bridges. A driver 14 is connected upstream of a control input 13 of a respective switching element 12. For reasons of clarity, only one switching element 12 and one driver 14 have been given reference signs here. The drivers 14 receive pulse-width-modulated switching signals 15 from the control device 8 that are provided such that an output voltage for feeding the electric machine 3 is made available at a respective tap of the half-bridges. The power unit 7 therefore converts a DC link voltage 27, which is smoothed by the DC link capacitor 6, into an AC voltage, having three phases in this case, depending on the switching signals 15.

The first measuring device 9 is configured to acquire the phase currents and to provide measurement signals to the analog-to-digital converter device 11 which converts the analog measurement signals of the first measuring device 9 into digital current information 16. The second measuring device 10 is accordingly configured to acquire a rotation speed of the electric machine 3 and to provide measurement signals to the analog-to-digital converter device 11 which converts the analog measurement signals of the second measuring device 10 into digital rotation speed information 17. The control device 8 receives the current information 16 and the rotation speed information 17 at its input.

On the basis of the current information 16 and the rotation speed information 17, the control device 8 determines a piece of operating point information that describes an operating point defined by a rotation speed and a torque of the electric machine 3. The control device 8 is configured to ascertain a carrier frequency of the pulse-width-modulated switching signals 15. For this purpose, the control device 8 comprises a memory unit 18 in which a characteristic map that assigns carrier frequency values to pairs of rotation speed values and torque values is stored. The control device 8 selects a corresponding carrier frequency value from the characteristic map on the basis of the operating point information.

Figure 2:
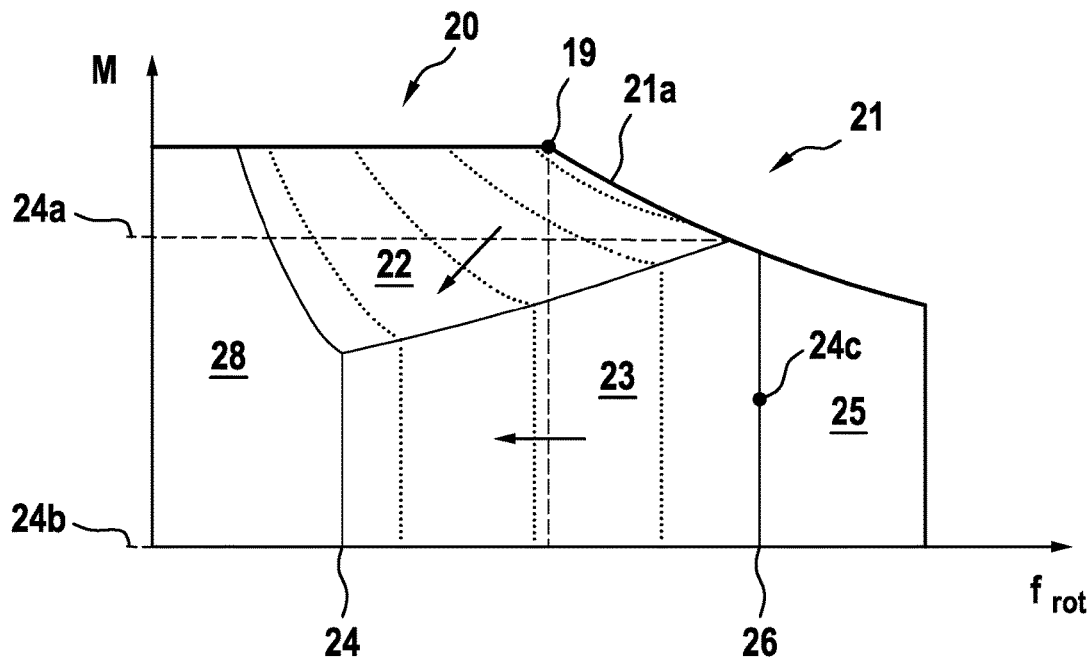
FIG. 2 shows a torque-rotation speed graph on which operating ranges relating to the operation of the assembly shown in FIG. 1 have been marked.

FIG. 2 is a torque-rotation speed graph on which operating ranges when operating the assembly shown in FIG. 1 have been marked, wherein a torque is indicated by M and a rotation speed by $f_{rot}$.

The graph illustrates the characteristic map that describes an association between the pairs and the carrier frequency values. A corner operating point 19 is first shown in FIG. 2, describing the absolute value of a maximum torque when transitioning from a fundamental rotation speed operation 20 to a power-limiting operation 21 or to a field-weakening operation. Furthermore, isolines of the specified carrier frequency values are illustrated using fine dashes.

From a full-load operating point, which in this case corresponds to the corner operating point 19, but can alternatively be up to 40 percent of the rotation speed at the corner operating point 19 deviating therefrom on a full-load line 21a, a first operating range 22 extends into a partial-load operation of the electric machine 3. The control device 8 is configured to specify the carrier frequency in the first operating range 22 at a maximum carrier frequency operating point corresponding to the full-load operating point at a maximum carrier frequency and to reduce this as the distance from the full-load operating point increases. The assignment of the carrier frequency values to the operating points is selected here in such a way that a peak-valley value of a DC link voltage 27 is essentially identical in the entire first operating range 22.

For the partial-load operation of the electric machine 3, lower switching losses of the switching elements 12 are thus achieved than in the case of an operation at a fixed carrier frequency according to the prior art because the carrier frequency is reduced in comparison therewith. Since the DC link capacitor 6 is in any case designed to operate with the peak-valley value of the DC link voltage 27 at the full-load operating point, a reduction in the switching losses in partial-load operation is achieved in the first operating range without having to increase the capacitance of the DC link capacitor 6.

For the first operating range 22, the following holds true for the carrier frequency $$f_{PWM} = \frac{u_{DC,pp}|_{f_{PWM,max}}}{u_{DC,pp,max}} \cdot f_{PWM,max}.$$

Here, $$u_{DC,pp}|_{f_{PWM,max}}$$

denotes the peak-valley value of the DC link voltage, which is dependent on the torque and the rotation speed, at the maximum carrier frequency at the full-load operating point $f_{PWM,max}$ and $u_{DC,pp,max}$ denotes a specified maximum value of the peak-valley value. The peak-valley value of the DC link voltage 27 is defined here as follows:

$$u_{DC,pp} = \max(u_{DC}(t)) - \min(u_{DC}(t))$$

Here, $u_{DC}(t)$ denotes the time profile of the DC link voltage 27 over an electric motor period.

A second operating range 23 comprises operating points above a first rotation speed threshold value 24, below a second rotation speed threshold value 26 lying above the first rotation speed threshold value 24, and between an upper torque limit 24a and a lower torque limit 24b. The control device 8 is configured to reduce the carrier frequency in the second operating range 23 compared to a maximum carrier frequency value operating point, which is an operating point 24c with a rotation speed corresponding to the second rotation speed threshold value 26, as the rotation speed decreases independently of the torque, as can be seen from the vertical isolines. This prevents undesirably high harmonic distortions, in particular high THD (Total Harmonic Distortion) values, which can lead to mechanical vibrations in the electric machine 3, from occurring.

For the second operating range 23, the following holds true for the carrier frequency $$f_{PWM} = \frac{f_{rot}}{f_{rot,max}} \cdot f_{PWM,max}$$

Here, $f_{rot}$ denotes the rotation speed and $f_{rot,max}$ denotes a maximum rotation speed or the second rotation speed threshold value 26.

In addition, FIG. 2 shows an optional third operating range 25, which includes operating points above the second rotation speed threshold value 26. The control device 8 is configured to specify the carrier frequency within the third operating range 25 with a fixed value. This corresponds to the highest carrier frequency value provided in the second operating range 23 or lies above it. If the third operating range 25 is not provided, then the second rotation speed threshold value 26 corresponds to a maximum rotation speed of the characteristic map.

The control device 8 is, finally, configured not to ascertain the carrier frequency below a specified minimum value. A fourth operating range 28 is marked in this respect, in which the minimum value is specified.

In summary, the characteristic map for the first operating range 22, the second operating range 23 and the fourth operating range 28 depicts the following relationship:

$$f_{PWM} = \max\left(\frac{u_{DC,pp}\,|f_{PWM,max}}{u_{DC,pp,max}} \cdot f_{PWM,max}, \frac{f_{rot}}{f_{rot,max}} f_{PWM,max}, f_{PWM,min}\right)$$

The control device 8 is configured to update the carrier frequency regularly. This is performed, for example, upon receipt of an updated piece of operating point information, after a specified or specifiable period of time has elapsed, after completion of an electrical period of the electric machine 3 or after completion of a period of a respective switching signal 15. Combinations of the updating events referred to above are also possible.

According to a further exemplary embodiment of the control device 8, the characteristic map is defined by discrete pairs, and the control device 8 is configured to ascertain the carrier frequency through, in particular linear, interpolation of the carrier frequency values assigned to the discrete pairs. According to a further exemplary embodiment, the control device 8 is configured to ascertain the carrier frequency by means of an analytical calculation specification from which the carrier frequency can be ascertained depending on the operating point instead of on the basis of the characteristic map. According to a further exemplary embodiment, the torque information is not ascertained with reference to the current information 16, but is estimated or measured by the control device 8 in the context of a control process for ascertaining the switching signals 15.

Figure 3:
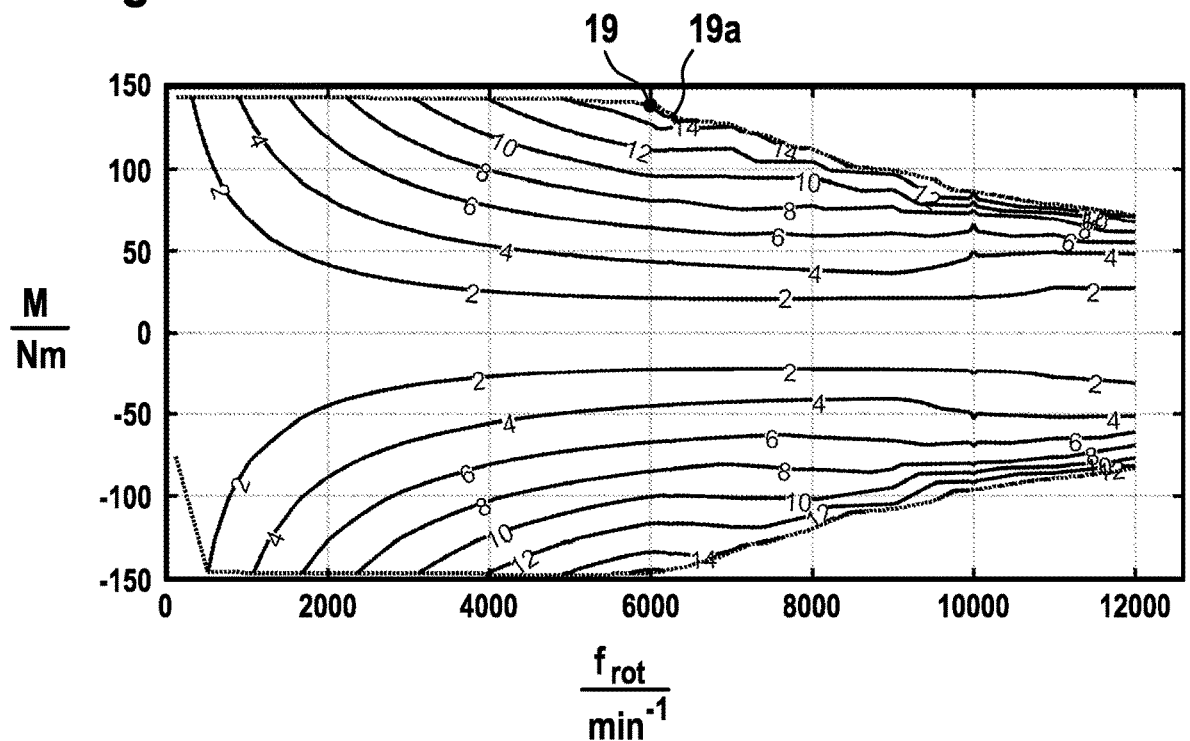
FIG. 3 shows a torque-rotation speed graph on which peak-valley values of a DC link voltage have been marked for an assembly according to the prior art.

FIG. 3 is a torque-rotation speed graph on which peak-valley values of a DC link voltage have been marked for an assembly according to the prior art. With this assembly, however, provision is made for the carrier frequency to be specified at a constant 10 kHz for all the operating points of the torque-rotation speed graph.

The peak-valley values are illustrated in FIG. 3 by isolines on which the peak-valley value assigned thereto is given in volts. As seen from the full-load operating point, which here corresponds to an operating point 19a shifted slightly to the right with respect to a corner operating point 19, the peak-valley value essentially decreases continuously as the distance from the full-load operating point increases. An intermediate capacitor of the assembly according to the prior art is to be regarded as oversized per se for partial-load operation and considerable switching losses occur in partial-load operation because of the constant carrier frequency.

Figure 4:
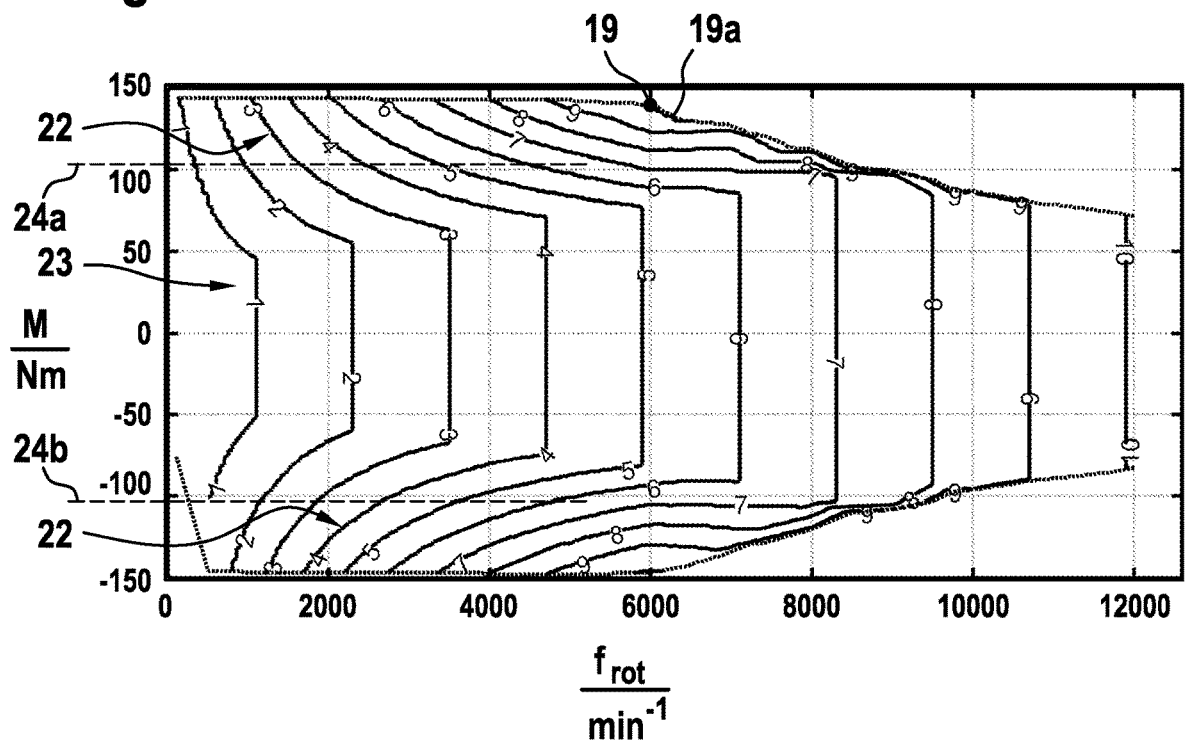
FIG. 4 shows a torque-rotation speed graph on which carrier frequency values when operating a further exemplary embodiment of the assembly according to the invention have been marked.

FIG. 4 is a torque-rotation speed graph on which carrier frequency values when operating a further exemplary embodiment of the assembly 1 have been marked. This exemplary embodiment corresponds to one of the previously described exemplary embodiments, with the characteristic map also being defined for negative torque values. The full-load operating point corresponds here—as in the example according to the prior art in FIG. 3—to an operating point 19a shifted to the right with respect to the corner operating point. The characteristic map has been ascertained here experimentally or through simulation and shows the following relationship:

$$f_{PWM} = \max\left(\frac{u_{DC,pp}\,|f_{PWM,max}}{u_{DC,pp,max}} \cdot f_{PWM,max}, \frac{f_{rot}}{f_{rot,max}} \cdot f_{PWM,max}\right)$$

This results in two first operating ranges 22 and a second operating range 23, which includes operating points between the positive upper torque limit 24a and the negative lower torque limit 24b. The third operating range 25 and the fourth operating range 28 are not provided in this exemplary embodiment.

Figure 5:
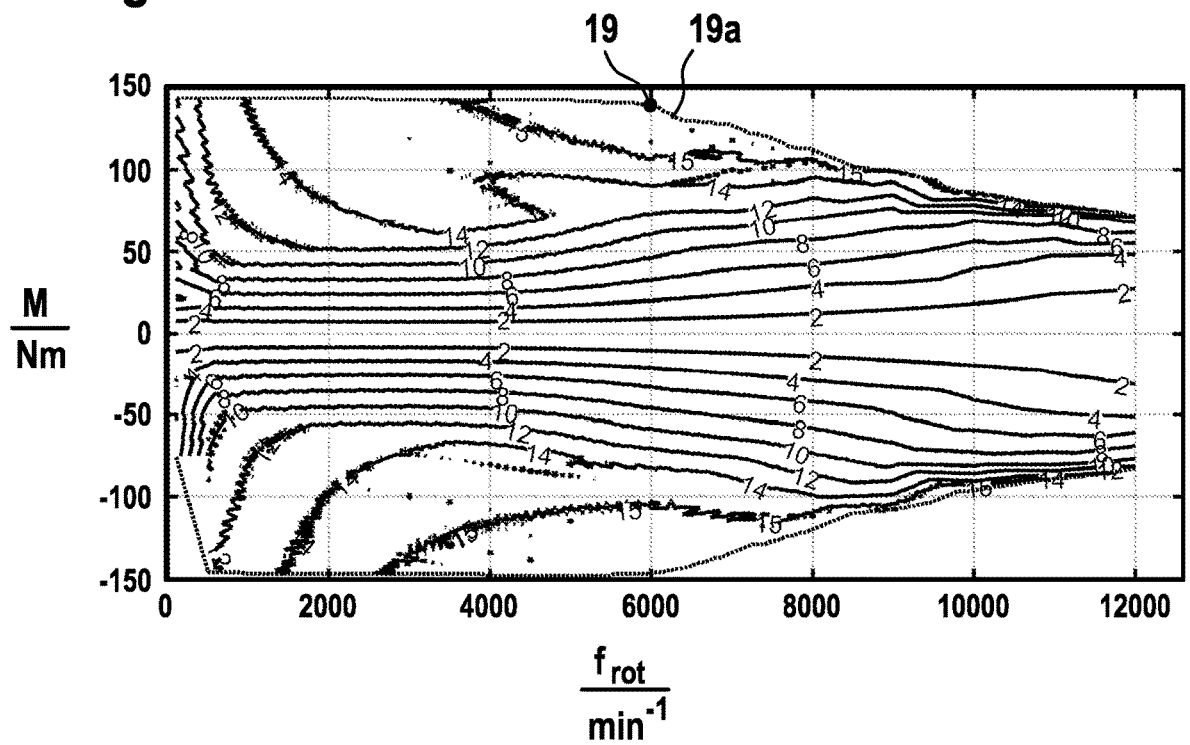
FIG. 5 shows a torque-rotation speed graph on which peak-valley values of a DC link voltage of the further exemplary embodiment have been marked.

FIG. 5 is a torque-rotation speed graph on which peak-valley values of the DC link voltage 27 during operation of the assembly 1 according to the aforementioned exemplary embodiment have been marked. The peak-valley values are illustrated by isolines on which the peak-valley value assigned thereto is given in volts. In comparison to FIG. 3, it is immediately apparent that in partial-load operation there are peak-valley values that are significantly higher but do not exceed the maximum value of the peak-valley values at the full-load operating point. However, since significantly lower carrier frequencies than the 10 kHz used in the prior art according to FIG. 3 are used in partial-load operation according to FIG. 4, a considerable reduction in switching losses is achieved.

Figure 6:
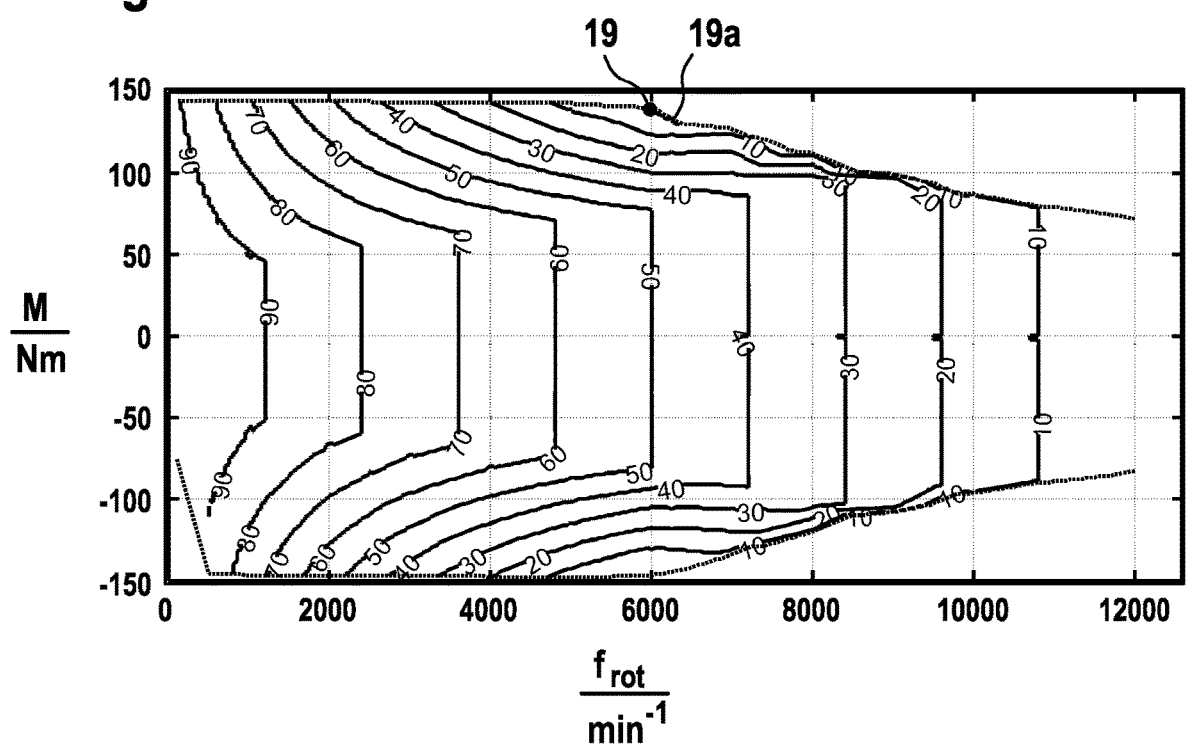
FIG. 6 shows a torque-rotation speed graph in which a percentage reduction in switching losses of the further exemplary embodiment compared to the prior art according to FIG. 3 is marked.

FIG. 6 is a torque-rotation speed graph in which a percentage reduction in switching losses of the aforementioned exemplary embodiment compared to the prior art according to FIG. 3 is shown. In this respect, the reduction in switching losses is given in percent on the isolines. It can be seen that the operating efficiency is considerably improved by the operation-dependent ascertainment of the carrier frequency.

The invention claimed is:

1. A control device for an inverter that feeds an electric machine, wherein the control device comprises:
   a computer; and
   a computer program comprising commands which, when executed by the computer, cause the control unit to:
      provide pulse-width-modulated switching signals at a carrier frequency to drive switching elements of the inverter, and
      ascertain the carrier frequency within at least one operating range depending on a piece of operating point information that describes an operating point defined by a rotation speed and a torque of the electric machine in such a way that the carrier frequency is reduced within the at least one operating range compared to a maximum carrier frequency operating point at which a maximum carrier frequency is specified in the operating range,
   wherein an operating range has a full-load operating point, at which a maximum torque that is specified in terms of absolute value for its rotation speed is present, as the maximum carrier frequency operating point and extends into partial-load operation, and
   wherein the control device is configured to reduce the carrier frequency as the distance from the maximum carrier frequency operating point increases.

2. The control device as claimed in claim 1, wherein the rotation speed of the full-load operating point deviates by a maximum 30 percent, from the rotation speed at a corner operating point, which describes a transition from a basic rotation speed operation to a power-limiting operation or to a field-weakening operation.

3. The control device as claimed in claim 1, wherein an operating range lies within a torque interval limited by an upper torque limit and a lower torque limit and the control device is configured to reduce the carrier frequency in the operating range as the rotation speed decreases, in particular independently of the torque.

4. The control device as claimed in claim 3, wherein the operating ranges are defined without overlapping and/or specifiable carrier frequencies run continuously at boundaries at which the operating ranges adjoin one another.

5. The control device as claimed in claim 1, which is configured to specify the carrier frequency with a fixed value within a further operating range defined without overlapping with respect to the at least one operating range and comprising operating points above a rotation speed threshold value.

6. The control device as claimed in claim 1, which is configured not to ascertain the carrier frequency below a specified or specifiable minimum value.

7. The control device as claimed in claim 1, which is configured to:
   select the carrier frequency from a characteristic map that assigns carrier frequency values to pairs of rotation speed values and torque values, or
   ascertain the carrier frequency by means of an analytical calculation specification from which the carrier frequency can be ascertained depending on the operating point.

8. The control device as claimed in claim 1, which is configured to ascertain an updated carrier frequency in each case
   upon receipt of an updated piece of operating point information,
   after a specified or specifiable period of time has elapsed,
   after completion of an electrical period of the electric machine,
   after completion of a period of a respective switching signal.

9. The control device as claimed in claim 1, which is configured to ascertain the operating point information from a piece of torque information received at an input and/or a piece of rotation speed information received at an input and/or depending on a piece of current information describing phase currents feeding the electric machine received at an input, and/or to estimate the operating point information in the context of a control process for ascertaining the switching signals.

10. An inverter, comprising:
   a DC link capacitor;
   switching elements which are interconnected to convert a DC link voltage applied to the DC link capacitor into a single-phase or multi-phase AC voltage depending on switching signals that drive the switching elements; and
   a control device as claimed in claim 1.

11. An assembly comprising:
   an inverter as claimed in claim 10; and
   an electric machine operated by the AC voltage.

12. The assembly as claimed in claim 11, wherein the ascertainment of the carrier frequency represents the relationship $$f_{PWM} = \frac{u_{DC,pp}|_{f_{PWM,max}}}{u_{DC,pp,max}} \cdot f_{PWM,max}$$

or $$f_{PWM} = \max\left(\frac{u_{DC,pp}|_{f_{PWM,max}}}{u_{DC,pp,max}} \cdot f_{PWM,max}, \frac{f_{rot}}{f_{rot,max}} \cdot f_{PWM,max}\right)$$

or $$f_{PWM} = \max\left(\frac{u_{DC,pp}|_{f_{PWM,max}}}{u_{DC,pp,max}} \cdot f_{PWM,max}, \frac{f_{rot}}{f_{rot,max}} \cdot f_{PWM,max}, f_{PWM,min}\right)$$

during operation of the assembly, wherein
$f_{PWM}$ describes the carrier frequency to be ascertained,
$f_{PWM,max}$ describes a maximum carrier frequency,
$f_{PWM,min}$ describes a minimum value of the carrier frequency, $$u_{DC,pp}|_{f_{PWM,max}}$$

describes a peak-valley value of the DC link voltage at the maximum carrier frequency that is dependent on the torque and on the rotation speed,
$u_{DC,pp,max}$ describes a specified maximum value of the peak-valley value of the DC link voltage,
$f_{rot}$ describes the rotation speed and
$f_{rot,max}$ describes a maximum rotation speed.

13. A method for operating an inverter for the supply of an electric machine, comprising:

ascertaining a carrier frequency of pulse-width-modulated switching signals for driving the inverter within at least one operating range depending on a piece of operating point information that describes an operating point defined by a rotation speed and a torque of the electric machine in such a way such that the carrier frequency is reduced within the at least one operating range compared to a maximum carrier frequency operating point at which a maximum carrier frequency is specified in the at least one operating range; and providing the switching signals for switching elements of the inverter, wherein an operating range has a full-load operating point, at which a maximum torque that is specified in terms of absolute value for its rotation speed is present, as the maximum carrier frequency operating point and extends into partial-load operation, and wherein the control device is configured to reduce the carrier frequency as the distance from the maximum carrier frequency operating point increases.

14. A computer program, comprising commands which, when executed by a computer, cause the computer to execute the method as claimed in claim 13.

\* \* \* \* \*